(12) United States Patent
Kai et al.

(10) Patent No.: US 9,776,329 B2
(45) Date of Patent: Oct. 3, 2017

(54) SUPPORTING DEVICE, SUPPORTING UNIT SYSTEM AND SUPPORTING UNIT CONTROL SYSTEM

(71) Applicant: INDUSTRIAL TECHNOLOGY RESEARCH INSTITUTE, Hsin-Chu (TW)

(72) Inventors: Chen-Yu Kai, Pingtung County (TW); Jen-Ji Wang, Taichung (TW); Tzuo-Liang Luo, Taichung (TW); Wan-Ling Chen, Taichung (TW)

(73) Assignee: INDUSTRIAL TECHNOLOGY RESEARCH INSTITUTE, Hsin-Chu (TW)

( * ) Notice: Subject to any disclaimer, the term of this patent is extended or adjusted under 35 U.S.C. 154(b) by 119 days.

(21) Appl. No.: 14/977,905

(22) Filed: Dec. 22, 2015

(65) Prior Publication Data
US 2017/0100839 A1   Apr. 13, 2017

(30) Foreign Application Priority Data

Oct. 8, 2015  (TW) .............................. 104133265 A

(51) Int. Cl.
*B25J 9/12*    (2006.01)
*B25J 9/16*    (2006.01)
(Continued)

(52) U.S. Cl.
CPC ............ *B25J 9/1682* (2013.01); *B23Q 1/035* (2013.01); *B23Q 3/088* (2013.01); *B25B 11/005* (2013.01);
(Continued)

(58) Field of Classification Search
CPC . B25J 9/1682; B25J 3/088; B25J 9/102; B25J 9/104; B25J 9/12; B25J 9/161;
(Continued)

(56) References Cited

U.S. PATENT DOCUMENTS

| 4,088,312 A | 5/1978 | Frosch et al. |
| 4,684,113 A | 8/1987 | Douglas et al. |

(Continued)

FOREIGN PATENT DOCUMENTS

| CN | 100551609 C | 10/2009 |
| CN | 201908938 U | 7/2011 |

(Continued)

OTHER PUBLICATIONS

Intellectual Property Office, Ministry of Economic Affairs, R. O. C, "Office Action", dated Jan. 13, 2017, Taiwan.
(Continued)

*Primary Examiner* — McDieunel Marc
(74) *Attorney, Agent, or Firm* — Locke Lord LLP; Tim Tingkang Xia, Esq.

(57) ABSTRACT

A support device includes a supporting main body, a first angle rotation unit, a second angle rotation unit, a height adjustment structure, an absorbing unit and a driver motor unit. The absorbing unit is pivotally connected to the first angle rotation unit. The driver motor unit includes a first driving element, a second driving element and a third driving element. The first driving element drives the first angle rotation unit to adjust a rotation angle of the absorbing unit. The second driving element drives the second angle rotation unit for enabling the supporting main body to rotate around an axial thereof. The third driving element drives the height adjustment structure for enabling the supporting main body to move along the axial thereof. In addition, an support unit system and a support unit control system are also provided.

26 Claims, 7 Drawing Sheets

(51) Int. Cl.
| | |
|---|---|
| *B23Q 3/08* | (2006.01) |
| *B25J 9/10* | (2006.01) |
| *B25J 15/06* | (2006.01) |
| *B25J 19/00* | (2006.01) |
| *F16M 11/04* | (2006.01) |
| *F16M 11/12* | (2006.01) |
| *F16M 11/18* | (2006.01) |
| *B23Q 1/03* | (2006.01) |
| *B25B 11/00* | (2006.01) |
| *F16B 47/00* | (2006.01) |

(52) U.S. Cl.
CPC ............... *B25J 9/102* (2013.01); *B25J 9/104* (2013.01); *B25J 9/12* (2013.01); *B25J 9/161* (2013.01); *B25J 9/1671* (2013.01); *B25J 15/0683* (2013.01); *B25J 19/0091* (2013.01); *F16M 11/041* (2013.01); *F16M 11/046* (2013.01); *F16M 11/12* (2013.01); *F16M 11/18* (2013.01); *F16B 47/00* (2013.01); *Y10S 901/02* (2013.01)

(58) Field of Classification Search
CPC .... B25J 15/0683; B25J 19/0091; F16B 47/00; F16M 11/041; F16M 11/046; F16M 11/12; Y01S 901/02
USPC .................................................. 700/245, 248
See application file for complete search history.

(56) References Cited

U.S. PATENT DOCUMENTS

| | | | | |
|---|---|---|---|---|
| 4,837,984 | A | * | 6/1989 | David .................. B24B 7/12 451/300 |
| 5,163,793 | A | | 11/1992 | Martinez |
| 5,364,083 | A | | 11/1994 | Ross et al. |
| 5,372,357 | A | | 12/1994 | Blaimschein |
| 5,722,646 | A | | 3/1998 | Soderberg et al. |
| 6,024,349 | A | * | 2/2000 | Hoffmann ............ B25J 15/0616 269/17 |
| 6,209,188 | B1 | | 4/2001 | Soderberg et al. |
| 6,250,619 | B1 | | 6/2001 | Cook et al. |
| 8,322,700 | B2 | | 12/2012 | Saberton et al. |
| 8,333,925 | B2 | * | 12/2012 | Holmes .................. A47B 37/02 422/500 |
| 2007/0272727 | A1 | | 11/2007 | Yang |

FOREIGN PATENT DOCUMENTS

| | | |
|---|---|---|
| CN | 202356889 U | 8/2012 |
| CN | 202723442 U | 2/2013 |
| EP | 0463317 A1 | 1/1992 |
| EP | 2590778 A2 | 5/2013 |
| KR | 100477298 B1 | 3/2005 |
| KR | 100833102 B1 | 5/2008 |
| KR | 20130020471 A | 2/2013 |
| TW | 594297 B | 6/2004 |
| TW | 200944792 A | 11/2009 |
| TW | 201012728 A | 4/2010 |
| TW | M495139 U | 2/2015 |

OTHER PUBLICATIONS

Rajah Rasiah, Flexible production systems and local machine-tool subcontracting: electronics components transnationals in Malaysia, Cambridge Journal of Economics, 1994, 18, 279-298.
Josef F.A. Kessels et al., Fully 21/2D flow modeling of resin infusion under flexible tooling using unstructured meshes and wet and dry compaction properties, Composites Part A: Applied Science and Manufacturing, 2007, 38, 51-60.
Lu, Junbai et al., Multi-point location theory, method, and application for flexible tooling system in aircraft manufacturing, International Journal of Advanced Manufacturing Technology, 2011, 54, 729-736.
A. Millar et al., Reconfigurable flexible tooling for aerospace wing assembly, SAE International, 2009.
J. R. Thagard et al., Resin Infusion Between Double Flexible Tooling: Evaluation of Process Parameters, Journal of Reinforced Plastics and Composites, 2004, 23(16):1767-1778.
Norman Carter, The application of a flexible tooling system in a flexible manufacturing system, Robotica, 1985, vol. 3, 221-228.

* cited by examiner

SUPPORTING DEVICE, SUPPORTING UNIT SYSTEM AND SUPPORTING UNIT CONTROL SYSTEM

CROSS REFERENCE TO RELATED APPLICATION

This application also claims priority to Taiwan Patent Application No. 104133265 filed in the Taiwan Patent Office on Oct. 8, 2015, the entire content of which is incorporated herein by reference.

TECHNICAL FIELD

The present disclosure relates to a support device, a support unit system and a support unit control system, and more particularly, to a support device capable of being adjusted actively for enabling itself to attach to a workpiece and a support unit system and a support unit control system using the same.

BACKGROUND

It is generally known that a good holding device can be the key element to the quality of a machining process. However, for the modern small-volume large-variety production of custom-made products, the cost for designing holding devices for a wide range of different items can be a huge burden in any case. In addition to the need for developing a specifically designed holding device for each product, the mounting and detaching of such specifically designed holding device can be very complicated that the production line may not be flexible enough for allowing the same to be converted rapidly for producing another products. Moreover, in the processes for producing large parts for ships, aircrafts or automobiles, the number of holding devices that are required in the production process can be huge, resulting that not only the production cost can be colossal, but also there may require a huge space just for storing such tremendous amount of holding devices.

Conventionally, most support devices available today are designed as a universal joint with suction cups for adapting the same passively to the curves of a workpiece. Nevertheless, since the aforesaid conventional passive holding means is substantially a free support structure, the suction cups can be forced to displace freely when the workpiece is under pressure, and further can be deformed by the process working on the workpiece so that the suction cups may not be able to attached themselves effectively on the workpiece conforming to the curves of the workpiece for fixedly holding the same. Moreover, although the conventional suction cups are generally being assisted by a vacuuming means for reinforcing their ability to attach themselves upon a workpiece, the attachment may not be stably achieved on a workpiece surface with a large inclination angle that exceeds the maximum rotation angle of the universal joint. In addition, the universal joint may be rotated to an angle that obstructs the vacuuming of the suction cups, and thus the vacuum suction cups can not function normally.

SUMMARY

The present disclosure provides a support device, capable of actively attaching to a surface of a workpiece.

The present disclosure provides a support unit system, capable of utilizing a multiplexer to drive a plurality of driver motor units for enabling its support units to attach to a surface of a workpiece actively without the use of controller for controlling the driver motor units, and thus the cost for setting and installing the controllers is saved.

The present disclosure provides a support unit control system, capable of arranging the aforesaid support devices into a shape conforming to the curve of a workpiece surface automatically for allowing the support devices to attach themselves effective onto the workpiece surface, so that the time consumed for adjusting the positioning of the support devices is reduced.

The present disclosure provides a support device. The support device includes a supporting main body, a first angle rotation unit, a second angle rotation unit, a height adjustment unit, an absorbing unit and a driver motor unit. The first angle rotation unit is disposed at an end of the supporting main body while allowing the second angle rotation unit to be received inside the supporting main body, and the height adjustment unit to be disposed at another end of the supporting main body. The absorbing unit is pivotally connected at the first angle rotation unit. The driver motor unit includes a first driving element, a second driving element and a third driving element. The first driving element is coupled to the first angle rotation unit for driving the first angle rotation unit to adjust a rotation angle of the absorbing unit. The second driving element is coupled to the second angle rotation unit for driving the second angle rotation unit to drive the supporting main body to rotate around an axis of the supporting main body. The third driving element is coupled to the height adjustment unit for driving the height adjustment unit to drive the supporting main body to move along the axis of the supporting main body.

In an embodiment, the present disclosure provides a support unit system, comprising: a workpiece, a plurality of support devices and a control unit. The plural support devices are disposed on the workpiece and each of the plural support devices includes a supporting main body, a first angle rotation unit, a second angle rotation unit, a height adjustment unit, an absorbing unit and a driver motor unit. The first angle rotation unit is disposed at an end of the supporting main body while allowing the second angle rotation unit to be received inside the supporting main body, and the height adjustment unit to be disposed at another end of the supporting main body. The absorbing unit is pivotally connected at the first angle rotation unit. The driver motor unit includes a first driving element, a second driving element and a third driving element. The first driving element is coupled to the first angle rotation unit for driving the first angle rotation unit to adjust a rotation angle of the absorbing unit. The second driving element is coupled to the second angle rotation unit for driving the second angle rotation unit to drive the supporting main body to rotate around an axis of the supporting main body. The third driving element is coupled to the height adjustment unit for driving the height adjustment unit to drive the supporting main body to move along the axis of the supporting main body. The control unit is coupled to the plural support devices for enabling the control unit to drive the driving motor units of the plural support devices.

In an embodiment, the present disclosure provides a support unit control system, comprising: at least one support device, a coordinate importing unit, and a control unit. Each of the at least one support device includes a supporting main body, a first angle rotation unit, a second angle rotation unit, a height adjustment unit, an absorbing unit and a driver motor unit. The first angle rotation unit is disposed at an end of the supporting main body while allowing the second angle rotation unit to be received inside the supporting main body, and the height adjustment unit to be disposed at another end of the supporting main body. The absorbing unit is pivotally connected at the first angle rotation unit. The driver motor unit includes a first driving element, a second driving element and a third driving element. The first driving element is coupled to the first angle rotation unit for driving the first angle rotation unit to adjust a rotation angle of the absorbing unit. The second driving element is coupled to the second angle rotation unit for driving the second angle rotation unit to drive the supporting main body to rotate around an axis of the supporting main body. The third driving element is coupled to the height adjustment unit for driving the height adjustment unit to drive the supporting main body to move along the axis of the supporting main body. The coordinate importing unit is coupled to the at least one support device and is used for providing a position coordinate and a normal vector, wherein the normal vector is a conversion of the position coordinate. The control unit is couple to the coordinate importing unit for enabling the control unit to control the first driving element and the second driving element according to the normal vector and also to control the third driving element according to the position coordinate.

From the above description, it is noted that the support device of the present disclosure is equipped with a mechanism for lifting and rotating the same. In addition, since the rotation angle of the absorbing unit about the first rotation axis as well as that about the second rotation axis can be adjusted actively by the use of the driver motor unit while the driver motor unit can also be used to actively adjust the height of the absorbing unit, the absorbing unit is enabled to fit and attach itself fixedly and stably to all kinds of workpieces of any curved surface.

In the support unit system of the present disclosure, a common driver control device is achieved by the use of a multiplexer when the plural support devices are disposed on the workpiece, and the common driver control device of the multiplexer can be used for controlling the plural driver motor units simultaneously. Thereby, the structural complexity of the whole support unit system can be reduced and thus the cost relating to the installing of driver control units, such as controllers and drivers, is reduced.

In the support unit control system of the present disclosure, a computer aided design (CAD) file is provided and used, by that position coordinates and normal vectors relating to an interested curve surface of a workpiece can be obtained automatically, and thereafter, the position coordinates and normal vectors are converted into a coordinate information including the first rotation angle, the second rotation angle and the height of the related support devices by the use of coordinate importing unit and the coordinate information is transmitted to the control unit also by the coordinate importing unit for enabling the control unit to control the support devices to be arranged into a formation conforming to the interested curve surface of the workpiece without any manual adjustment. Consequently, the time consumed for adjusting the support arrangement can be reduced significantly.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

Figure 1:
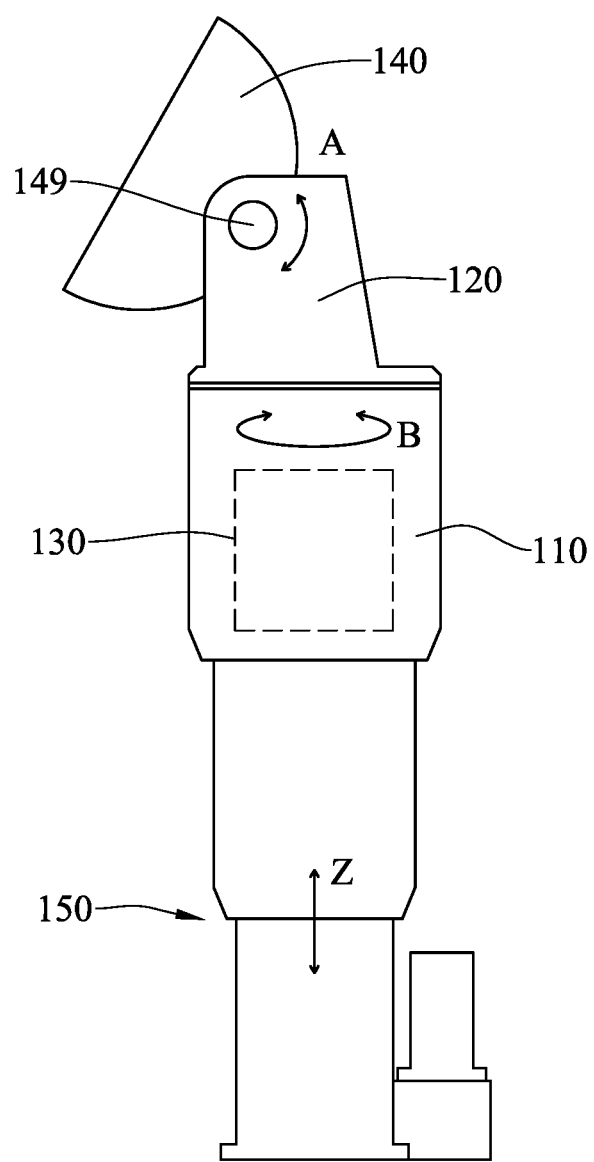
FIG. 1 is a schematic diagram showing a support device of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
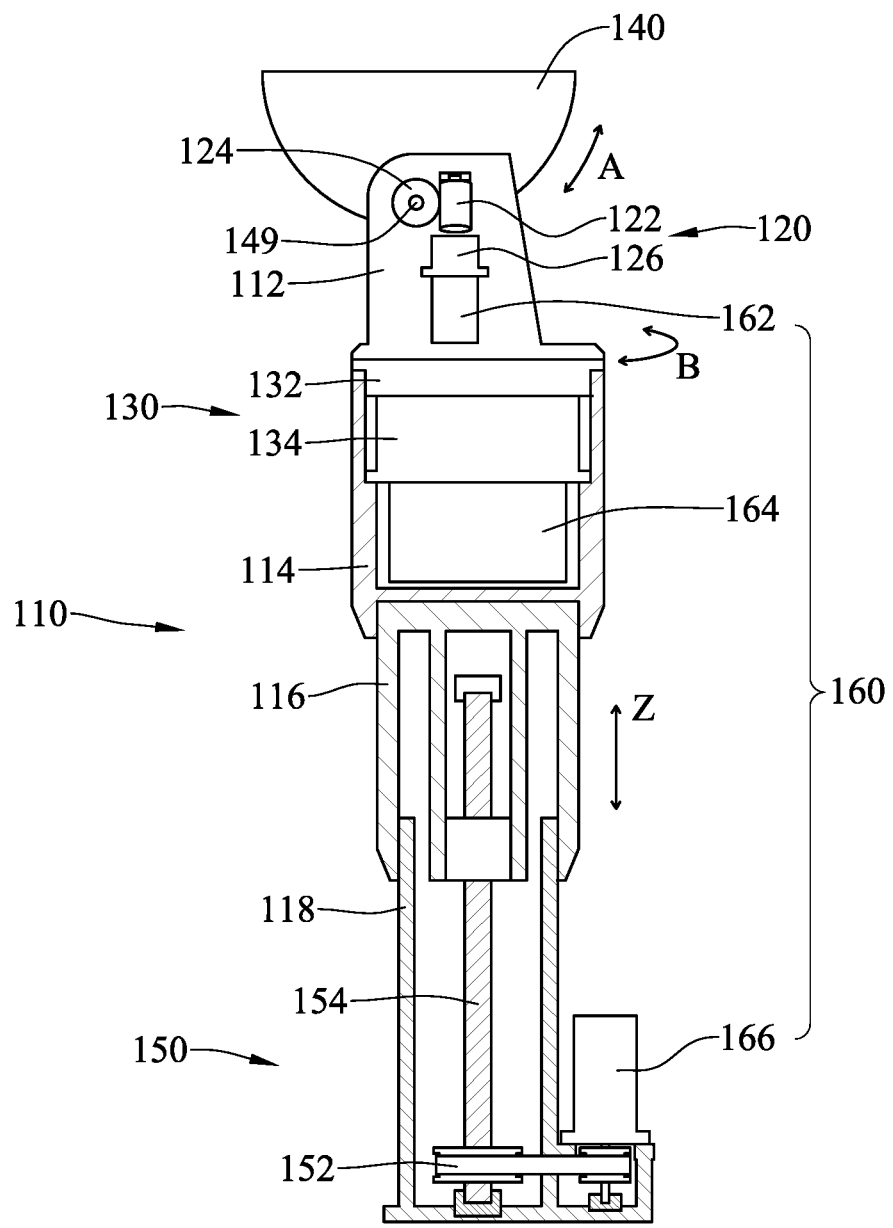
FIG. 2 is a structure diagram of the support device of FIG. 1.

FIG. 1 is a schematic diagram showing a support device of the present disclosure. FIG. 2 is a structure diagram of the support device of FIG. 1. In FIG. 1 and FIG. 2, the support device 100, that is used for supporting larger parts, such as a car panel or airframe wing, is composed of a supporting main body 110, a first angle rotation unit 120, a second angle rotation unit 130, an absorbing unit 140, a height adjustment unit 150 and a driver motor unit 160.

The absorbing unit 140 is pivotally connected at the first angle rotation unit 120. The first angle rotation unit 120 is disposed at an end of the supporting main body 110 while allowing the second angle rotation unit 130 to be received inside the supporting main body 110, whereas the height adjustment unit 150 is disposed at another end of the supporting main body 110.

The driver motor unit 160 includes a first driving element 162, a second driving element 164 and a third driving element 166, wherein the first driving element 162 is coupled to the first angle rotation unit 120, the second driving element 164 is coupled to the second angle rotation unit 130, and the third driving element 166 is coupled to the height adjustment unit 150.

Operationally, the first driving element 162 is used for driving the first angle rotation unit 120 to adjust a rotation angle of the absorbing unit 140, while the absorbing unit 140 is restricted to rotate within a range of a first axial rotation angle A; the second driving element 164 is used for driving the second angle rotation unit 130 to drive the supporting main body 110 to rotate around an axis of the supporting main body 110, while the absorbing unit 140 is restricted to rotate within a range of a second axial rotation angle B; and the third driving element 166 is used for driving the height adjustment unit 150 to drive the supporting main body 110 to move along the axis of the supporting main body 110, while enabling the absorbing unit 140 to move up and down following a height direction Z accordingly. Thereby, the support device 100 of the present disclosure is equipped with a mechanism capable of adjusting the rotation angle and the height of its absorbing unit 140. In addition, by the use of the driver motor unit 160 to actively adjust the first axial rotation angle A and the second axial rotation angle B of the absorbing unit 140, and also allowing the driver motor unit 160 to actively adjust the height of the absorbing unit 140, the absorbing unit 140 is able to attached itself effectively to a workpiece conforming to the curves of the workpiece for fixedly holding the workpiece.

Figure 3:
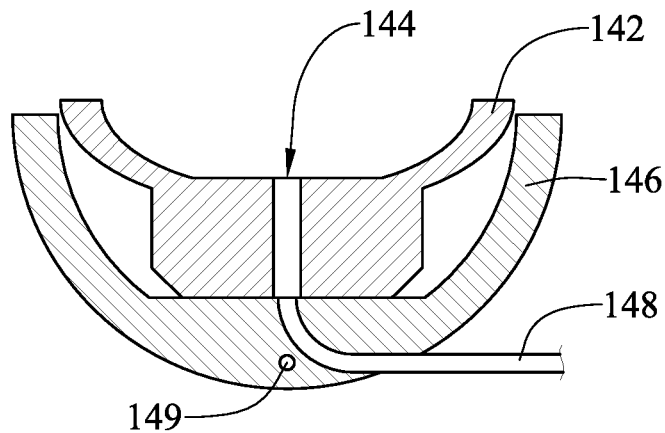
FIG. 3 is a schematic diagram showing an absorbing unit according to an embodiment of the present disclosure.

Please refer to FIG. 3, which is a schematic diagram showing an absorbing unit according to an embodiment of the present disclosure. In FIG. 3, the absorbing unit 140 is composed of a suction cup 142, a base 146, a vacuum tube 148 and an axial rod 149, whereas the axial rod 149 is disposed on the base 146.

The suction cup 142 can be made of an elastic material, such as rubber, and is formed with a hole 144 while being disposed on the base 146, whereas the base 146 can be made of a rigid material, i.e. the base 146 is substantially formed to be used as a rigid support structure. Thereby, while a vacuuming process is performed upon the vacuum tube 148, the absorbing unit 140 will exert a pulling force on the workpiece for fixing the same by the elasticity of the suction cup 142, and as the suction cup 142 is supported by the rigid base 146, it can provide sufficient support for supporting a workpiece that is even heavier and larger.

Figure 4:
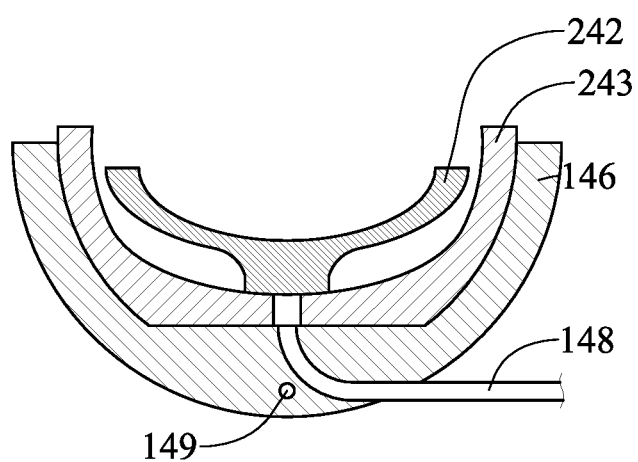
FIG. 4 is a schematic diagram showing an absorbing unit according to another embodiment of the present disclosure.

Please refer to FIG. 4, which is a schematic diagram showing an absorbing unit according to another embodiment of the present disclosure. In this embodiment, the absorbing unit 240 further comprises a buffer element 243, that is disposed at a position between the suction cup 242 and the base 146, whereas the suction cup 242 is made of a rigid material, the buffer element 243 is made of an elastic material, such as rubber, and the base 146 is made of a rigid material. Thereby, while vacuuming in the vacuum tube 148, the suction cup 242 is forced to attach to a workpiece while the buffer element 243 will be forced to cover the suction cup 242 by the vacuuming force for providing sufficient suction to the workpiece.

As shown in FIG. 2, the supporting main body 110 further comprises: a first connecting element 112, a second connecting element 114, a third connecting element 116 and a fourth connecting element 118, in which the first connecting element 112 and the third connecting element 116 are arranged respectively at the two ends of the second connecting element 114, while enabling the third connecting element 116 to be slidably mounted the fourth connecting element 118.

In addition, the first angle rotation unit 120 is disposed at the first connecting element 112, and is composed of a worm 122, a worm gear 124 and a first reducer 126 in a manner that the output shaft of the first reducer 126 is coupled to the worm 122 for driving the worm 122 to drive the worm gear 124 to rotate accordingly.

The worm gear 124 is coupled to the axis shaft 149 of the absorbing unit 140 while the worm 122 is arranged neighboring to the worm gear 124 at a position inside the first angle rotation unit 120. In addition, the first angle rotation unit 120 can be a harmonic reducer that is disposed between the first driving element 162 and the worm 122 while enabling the first reducer 126 to coupled to the worm gear 122.

Operationally, the worm 122 can be driven to rotate by the first driving element 162 so as to drive the worm gear 124 to rotate accordingly, and thereby, the total volume of the support device 100 can be decreased effectively. In this embodiment, the first driving element 162 can be a small motor that is designed to work cooperatively with a small first reducer 126 with a high speed reduction ratio. Consequently, the torque from the first driving element 162 is amplified by the first reducer 126 so as to be used for adjusting the rotation speed of the worm 122, and thereby, the rotation of the absorbing unit 140 is adjustably restricted within a range of a first axial rotation angle A.

By the assembly of the worm 122 and the worm gear 124, a latch-up effect can be exerted to the absorbing unit 140 for allowing the same to provide a sufficient support, and consequently, the support device 100 that is restricted inside a comparatively small volume is able to provide a high supporting ability.

The second angle rotation unit 130 is disposed at the second connecting element 114, and further includes a turn table 132 and a second reducer 134 in a manner that the second reducer 134 is coupled to the turn table 132 to be used for adjusting the rotation speed of the turn table 132, and further the second reducer 134 is coupled to the second driving element 164, while the second driving element 164 is used for driving the turn table 132 to rotate so as to drive the supporting main body 110 to rotate around the axis of the supporting main body 110. For effectively reducing the volume of the support device 100, the second driving element 164 in this embodiment can be a small motor that is designed to work cooperatively with a small first reducer 126 with a high speed reduction ratio, whereas the second reducer 134 can be a harmonic reducer. Thereby, the torque from the second driving element 164 is amplified by the second reducer 134 so as to be used for adjusting the rotation speed of the turn table 132, and thereby, the rotation of the absorbing unit 140 is adjustably restricted within a range of a second axial rotation angle B.

The height adjustment unit 150 is disposed inside the third connecting element 116 and the fourth connecting element 118, and is further composed of a lead screw 154 and a timing pulley 152 in a manner that the lead screw 154 is coupled to the timing pulley 152, and the timing pulley 152 is coupled to the third driving element 166, while the third driving element 166 is substantially a motor that is used for driving the timing pulley 152 to rotate so as to drive the lead screw 154 to move along the axis of the supporting main body 110, and thereby, the third connecting element 116 can be driven to move up and down in a Z direction, so that the height of the absorbing unit 140 refer to the Z direction can be adjusted and determined.

Figure 5:
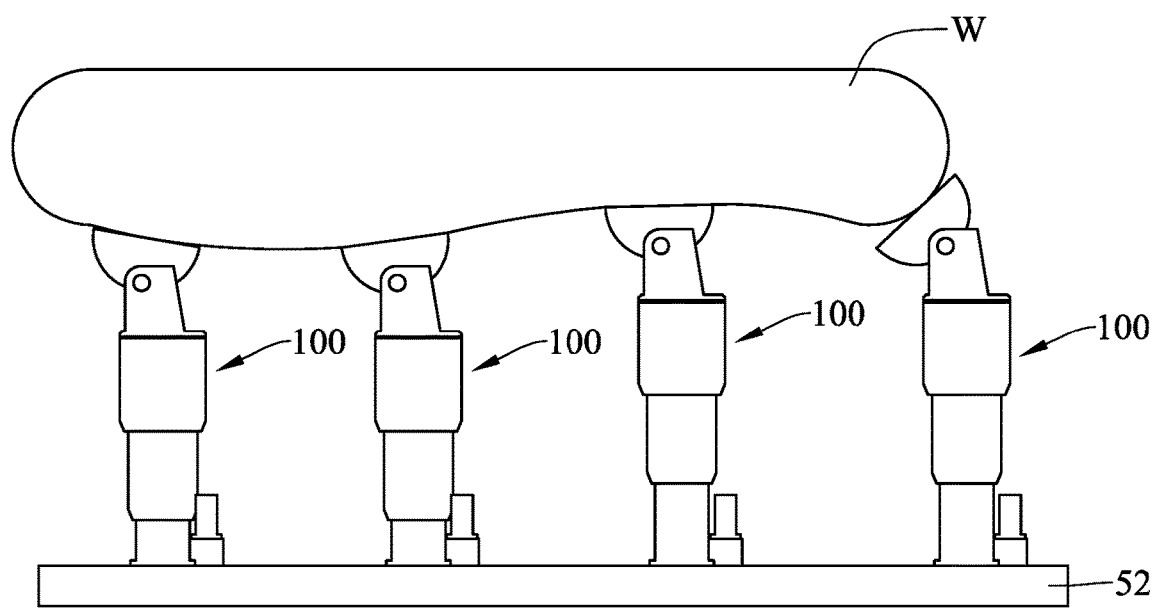
FIG. 5 is a schematic diagram showing a support unit system of the present disclosure.
Figure 6:
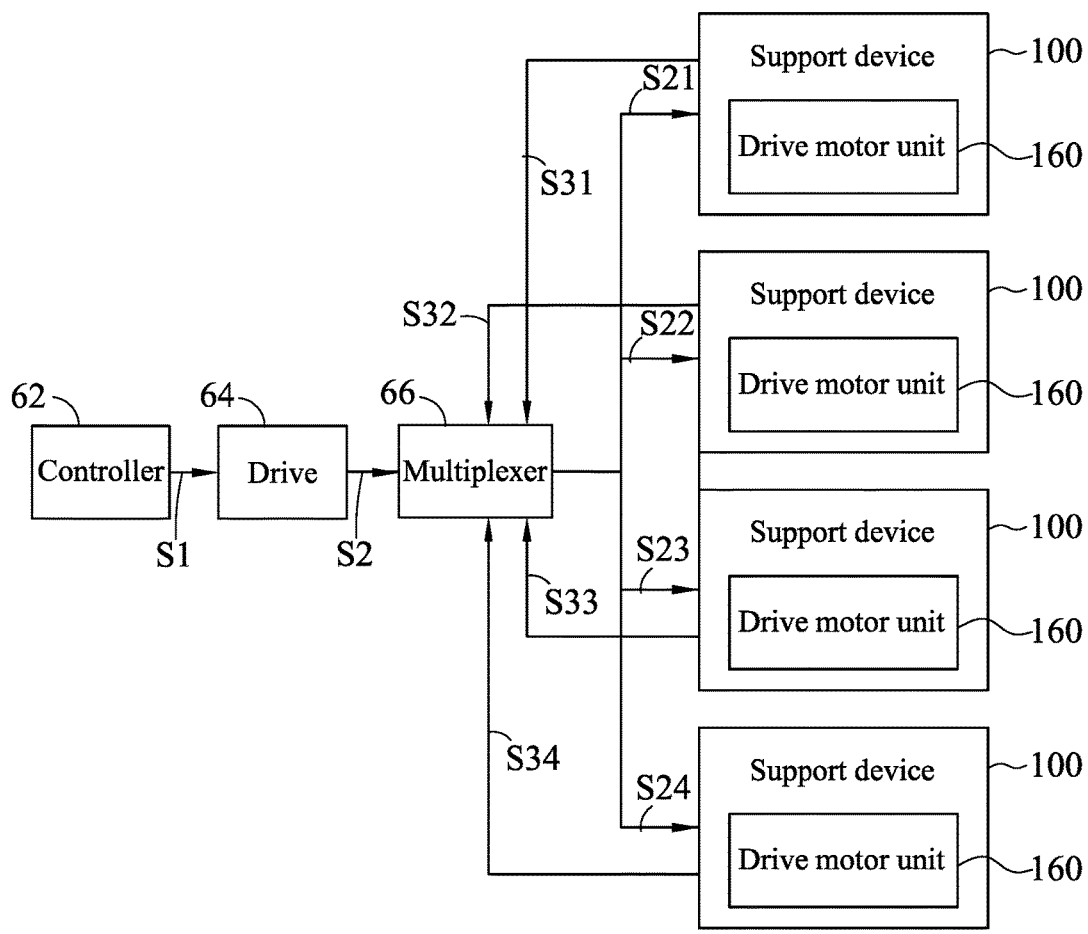
FIG. 6 is a block diagram showing a support device and a control unit used in the support unit system of FIG. 5.

FIG. 5 is a schematic diagram showing a support unit system of the present disclosure. FIG. 6 is a block diagram showing a support device and a control unit used in the support unit system of FIG. 5. As shown in FIG. 5 and FIG. 6, the support unit system 50 includes a workpiece 52, a plurality of support devices 100 and a control unit 60.

The plural support devices 100 are disposed on the workpiece 52 into an array for supporting a workpiece W. It is noted that each of the plural support devices 100 is structured the same those described in FIG. 1 to FIG. 4.

The control unit 60 is arranged coupling to the plural support devices 100 and is used for controlling the driver motor units 160 of the plural support devices 100.

More specifically, the control unit 60 is composed of a controller 62, a driver 64 and a multiplexer 66.

Operationally, the controller 62 is used for providing a signal S1; the driver 64 is electrically connected to the controller 62 for allowing the same to receive the signal from the controller 62 and consequently issue a driving signal S2 to the multiplexer 66; the multiplexer 66 is enabled to issue and distribute a plurality of multiplexing signals S21~S24 to the driver motor units 160 of the plural support devices 100 according to the driving signal S2. That is, the multiplexers 66 are disposed in the signal transmission path so as to achieve a common driver control apparatus. Further, in each of the plural support devices 100, the driver motor unit 160 receives the corresponding multiplexing signal S21~S24 to be used for driving the first angle rotation unit 120, the second angle rotation unit 130 and the height adjustment unit 150 to move accordingly. In another word, the driver motor unit 160 of each support device 100 is driven for controlling the rotation of the corresponding absorbing unit 140 in the first axial rotation angle A and the second axial rotation angle B and also the up-and-down in the Z direction, while at the same time, the workpiece is being hold and supported fixedly. In this embodiment, since there are multiplexing signal S21~S24 to be issued and distributed to their corresponding driver motor units 160 for controlling by the multiplexer 66 in the control unit 60, the plural driver motor units 160 are able to function without having to install a plurality of controllers for each individual driver motor unit 160. That is, by installing one multiplexer 66 in the control unit, there will be no need to equip one control unit for each individual driver motor unit 160. Thereby, not only the structural complexity of the whole support unit system 50 is decreased, but also the cost for setting and installing the control unit is saved.

In addition, there are feedback signals S31~S34 being issued by the driver motor units 160 of the plural support devices 100 back to the multiplexer 66, by that an information including the rotation of the corresponding absorbing unit 140 in the first axial rotation angle A and the second axial rotation angle B and also the up-and-down in the Z direction is obtained to be used in an process for determining whether the arrangement of the support devices is conforming to the curve and height requirements of the workpiece W. If not, the adjustment of the support devices 100 is continued; otherwise, the current setting of the support devices 100 is registered in a memory for allowing such setting to be retrievable and accessible for other occasion.

Figure 7:
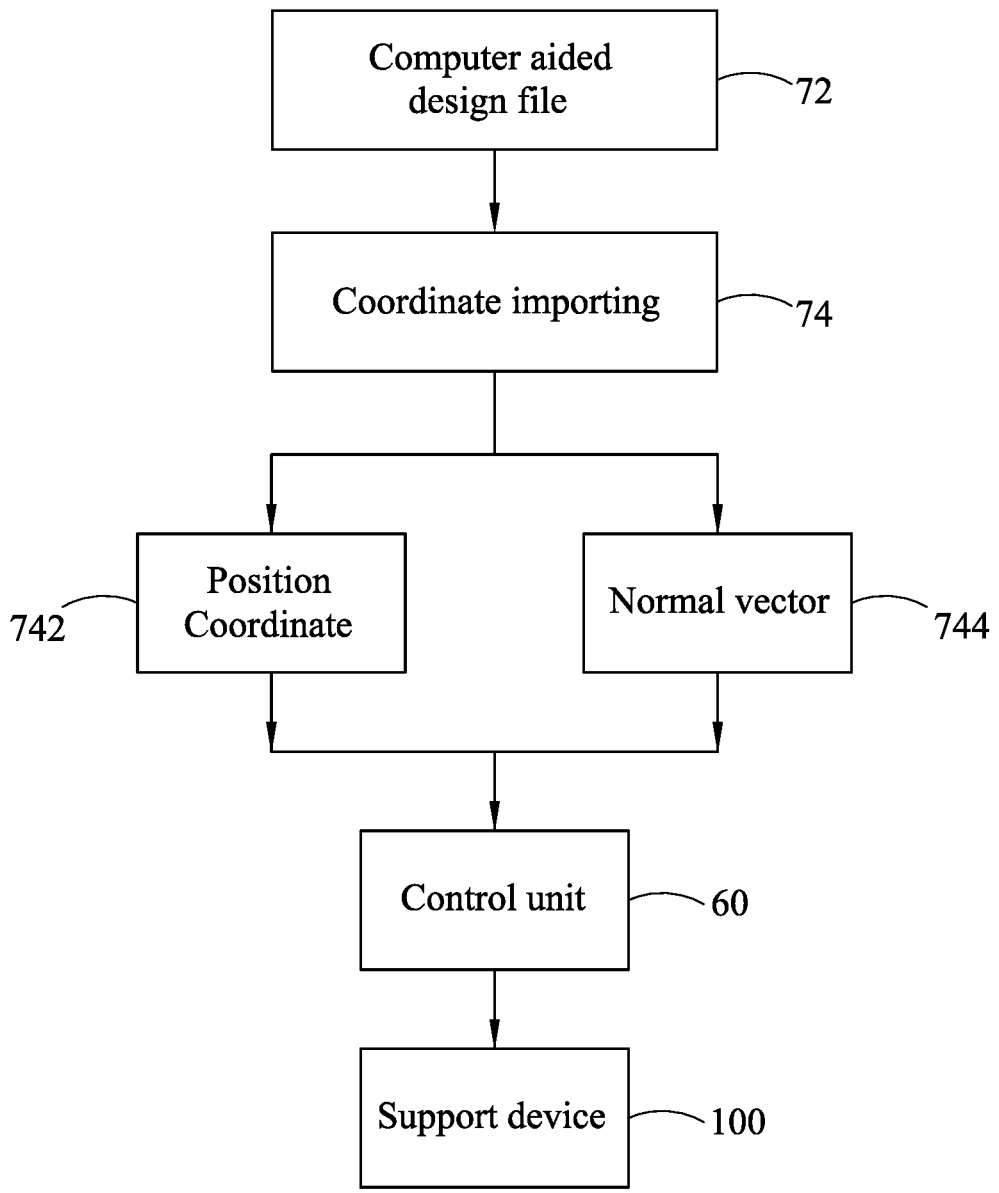
FIG. 7 is a block diagram showing a support unit control system of the present disclosure.

Please refer to FIG. 7, which is a block diagram showing a support unit control system of the present disclosure. In the embodiment shown in FIG. 7, the support unit control system 70 includes at least one support device 100, a computer aided design (CAD) file 72, a coordinate importing unit 74 and a control unit 60.

In this embodiment, the profile of a workpiece is described in a multi-grid G space by the simulation of a computer software into the CAD file 72.

Figure 8:
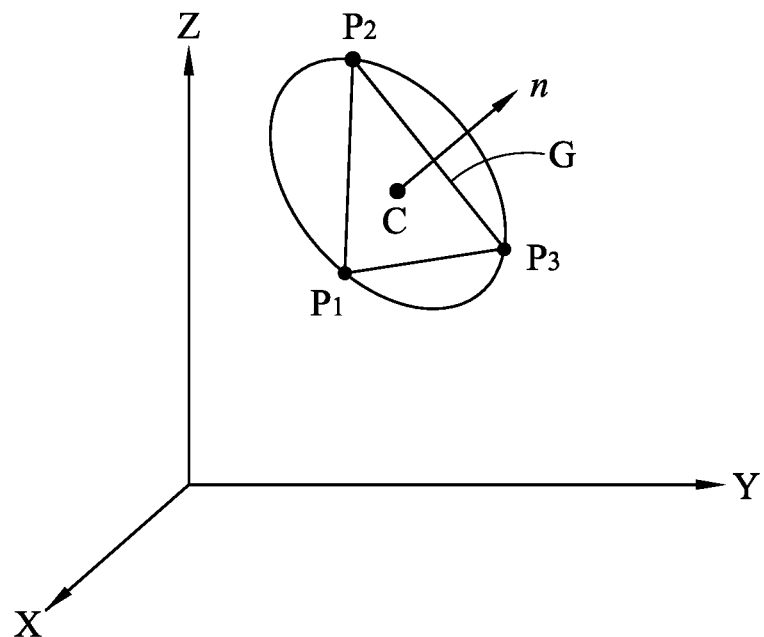
FIG. 8 is a schematic diagram showing a position coordinate and a normal vector of the present disclosure.

By performing a decoding process on each grid G in the CAD file 72, a position coordinate 742 can be obtained. Please refer to FIG. 8, which is a schematic diagram showing a position coordinate and a normal vector of the present disclosure. In FIG. 8, a three-dimensional coordinate system of X-axis, Y-axis and Z-axis is provided, and the position coordinate 742 includes a first point P1, a second point P2, and a third point P3, whereas the first point P1, the second point P2, and the third point P3 are concentrically arranged with respect to a common center C, and can be used for defined a normal n.

Figure 9:
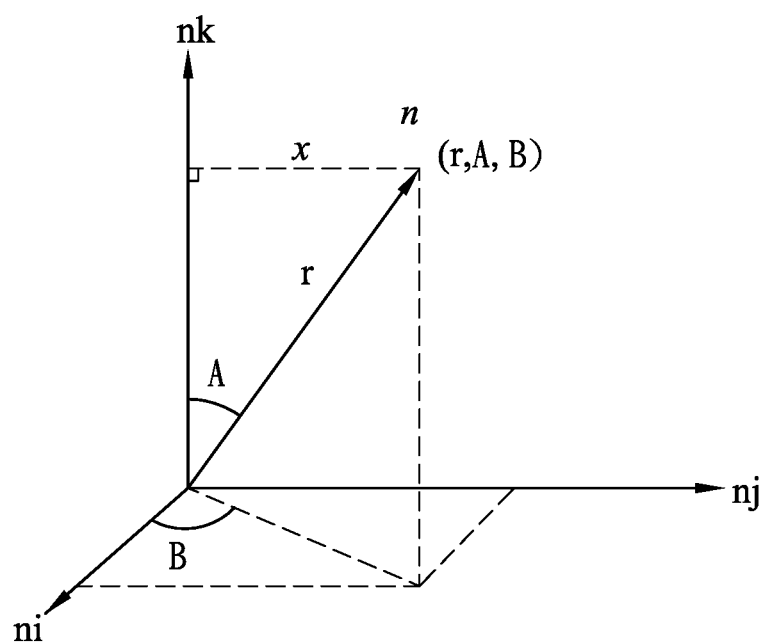
FIG. 9 is a schematic diagram showing the conversion of the normal vector of FIG. 8.

The coordinate importing unit 74 is used for providing the position coordinate 742 and the normal vector 744, whereas the normal vector 744 is a conversion of the position coordinate 742. Please refer to FIG. 9, which is a schematic diagram showing the conversion of the normal vector of FIG. 8. In FIG. 9, a three-dimensional coordinate system of $n_i$-axis, $n_j$-axis and $n_k$-axis is formed, which r is distance between a specific point to the origin point of the three-dimensional coordinate system, i.e. $r=\sqrt{n_i^2+n_j^2+n_k^2}$. In FIG. 9, the shape formed by the enclosure of the dotted line x, the slanted line r and the $n_k$-axis is a rectangular triangle, whereas $r^2=x^2+n_k^2$, and therefore $x=\sqrt{n_i^2+n_j^2}$. Thereby, the first axial rotation angle A and the second axial rotation angle B can be obtained by the following formula:

$$\tan A = \frac{x}{n_k} = \frac{\sqrt{n_i^2+n_j^2}}{n_k};$$

$$\text{and thus, } A = \tan^{-1}\left(\frac{\sqrt{n_i^2+n_j^2}}{n_k}\right); \text{ and}$$

$$\tan B = \frac{n_j}{n_i};$$

$$\text{thus } B = \tan^{-1}\left(\frac{n_j}{n_i}\right).$$

The control unit 76 is enabled to control the first driving element 162 and the second driving element 164 according to the normal vector 744 as the normal vector 744 includes information relating to the first axial rotation angle A and the second axial rotation angle B. In addition, the control unit 76 is also being enabled to control the third driving element 166 according to the position coordinate 742, i.e. the height of the center C indicated by the Z-axis value in the position coordinate 742. Operationally, the first driving element 162 is used for driving the first angle rotation unit 120 to adjust a rotation angle of the absorbing unit 140, while the absorbing unit 140 is restricted to rotate within a range of a first axial rotation angle A; the second driving element 164 is used for driving the second angle rotation unit 130 to drive the supporting main body 110 to rotate around an axis of the supporting main body 110, while the absorbing unit 140 is restricted to rotate within a range of a second axial rotation angle B; and the third driving element 166 is used for driving the height adjustment unit 150 to drive the supporting main body 110 to move along the axis of the supporting main body 110, while enabling the absorbing unit 140 to move up and down following a height direction Z accordingly.

Thereby, the aforesaid support unit control system 70 is able to obtain the information including the position coordinate 742 and the normal vector 744 that is needed for properly support a workpiece while enabling its support devices to conform to the curvature of the workpiece can be obtained from the CAD file 72 automatically, whereas the information including the position coordinate 742 and the normal vector 744 is converted into information relating to the first axial rotation angle A, the second axial rotation angle B and height in Z direction by the coordinate importing unit 74 so as to be fed into the control unit 76 for enabling the control unit 76 to control the support devices 100 to be arranged into a formation conforming to the interested curve surface of the workpiece without any manual adjustment. Consequently, the time consumed for adjusting the support arrangement can be reduced significantly.

From the above description, it is noted that the support device of the present disclosure is equipped with a mechanism for lifting and rotating the same. In addition, since the rotation angle of the absorbing unit about the first rotation axis as well as that about the second rotation axis can be adjusted actively by the use of the driver motor unit while the driver motor unit can also be used to actively adjust the height of the absorbing unit, the absorbing unit is enabled to fit and attach itself fixedly and stably to all kinds of workpieces of any curved surface.

In the support unit system of the present disclosure, a common driver control device is achieved by the use of a multiplexer when the plural support devices are disposed on the workpiece, and the common driver control device of the multiplexer can be used for controlling the plural driver motor units simultaneously. Thereby, the structural complexity of the whole support unit system can be reduced and thus the cost relating to the installing of driver control units, such as controllers and drivers, is reduced.

In addition, in the support unit control system of the present disclosure, a computer aided design (CAD) file is provided and used, by that position coordinates and normal vectors relating to an interested curve surface of a workpiece can be obtained automatically, and thereafter, the position coordinates and normal vectors are converted into a coordinate information including the first rotation angle, the second rotation angle and the height of the related support devices by the use of coordinate importing unit and the coordinate information is transmitted to the control unit also by the coordinate importing unit for enabling the control unit to control the support devices to be arranged into a formation conforming to the interested curve surface of the workpiece without any manual adjustment. Consequently, the time consumed for adjusting the support arrangement can be reduced significantly.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A support device, comprising:
   a supporting main body;
   a first angle rotation unit, disposed at an end of the supporting main body;
   a second angle rotation unit, disposed inside the supporting main body;
   a height adjustment structure, disposed at another end of the supporting main body;
   an absorbing unit, pivotally connected at the first angle rotation unit; and
   a driving motor unit, further comprising: a first driving element, a second driving element and a third driving element;
   wherein, the first driving element is coupled to the first angle rotation unit for driving the first angle rotation unit to drive and adjust the rotation angle of the absorbing unit; the second driving element is coupled to the second angle rotation unit for driving the second angle rotation unit to drive the supporting main body to rotate around the axis of the supporting main body; and the third driving element is coupled to the height adjustment structure for driving the height adjustment structure to drive the supporting main body to move along the axis of the supporting main body.

2. The support device of claim 1, wherein the absorbing unit is composed of a suction cup, a vacuum tube and a base in a manner that the suction cup is disposed on the base while allowing the vacuum tube to connect to the suction cup.

3. The support device of claim 2, wherein the suction cup is made of an elastic material and the base is made of a rigid material.

4. The support device of claim 2, wherein the absorbing unit has a buffer element to be disposed at a position between the suction cup and the base, and the suction cup is made of a rigid material, the buffer element is made of an elastic material and the base is made of a rigid material.

5. The support device of claim 2, wherein the absorbing unit further includes an axial shaft, that is arranged penetrating through the base; the first angle rotation unit further includes a worm and a worm gear that the worm gear is coupled to the axis shaft of the absorbing unit while the worm is arranged neighboring to the worm gear at a position inside the first angle rotation unit; and the first driving element is substantially a motor and is used for driving the worm to rotate while bringing along the worm gear to rotate accordingly, and thus adjusting the rotation angle of the absorbing unit.

6. The support device of claim 5, wherein the first angle rotation unit includes a first reducer, and the first reducer is coupled to the worm to be used for adjusting the rotation speed of the worm.

7. The support device of claim 1, wherein the second angle rotation unit further includes a turn table and a second reducer; the second reducer is coupled to the turn table to be used for adjusting the rotation speed of the turn table, and further the second reducer is coupled to the second driving element, while the second driving element is substantially a motor that is used for driving the turn table to rotate so as to drive the supporting main body to rotate around the axis of the supporting main body.

8. The support device of claim 1, wherein the height adjustment structure further includes a lead screw and a timing pulley; the lead screw is coupled to the timing pulley, the timing pulley is coupled to the third driving element, while the third driving element is substantially a motor that is used for driving the timing pulley to rotate so as to drive the lead screw to move along the axis of the supporting main body.

9. A support unit system, comprising:
   a workpiece,
   a plurality of supporting devices, disposed on the workpiece while each of the supporting device further comprising:
   a supporting main body;
   a first angle rotation unit, disposed at an end of the supporting main body;
   a second angle rotation unit, disposed inside the supporting main body;
   a height adjustment structure, disposed at another end of the supporting main body;
   an absorbing unit, pivotally connected at the first angle rotation unit; and
   a driving motor unit, further comprising: a first driving element, a second driving element and a third driving element wherein the first driving element is coupled to the first angle rotation unit for driving the first angle rotation unit to adjust the rotation angle of the absorbing unit; the second driving element is coupled to the second angle rotation unit for driving the second angle rotation unit to drive the supporting main body to rotate with respect to the axis of the supporting main body; and the third driving element is coupled to the height adjustment structure for driving the height adjustment structure to drive the supporting main body to move along the axis of the supporting main body; and a control unit, coupled to the plural support devices for enabling the control unit to drive the driving motor units of the plural support devices;

wherein, the first driving element is coupled to the first angle rotation unit for driving the first angle rotation unit to drive and adjust the rotation angle of the absorbing unit; the second driving element is coupled to the second angle rotation unit for driving the second angle rotation unit to drive the supporting main body to rotate around the axis of the supporting main body; and the third driving element is coupled to the height adjustment structure for driving the height adjustment structure to drive the supporting main body to move along the axis of the supporting main body.

10. The support unit system of claim 9, wherein the control unit further includes a controller, a driver and a multiplexer; the controller is used for providing a signal; the driver is electrically connected to the controller for allowing the same to receive the signal from the controller and consequently issue a driving signal to the multiplexer; the multiplexer is enabled to issue and distribute a plurality of multiplexing signals to the plural support devices according to the driving signal; and in each of the plural support devices, the driver motor unit receives the corresponding multiplexing signal to be used for driving the first angle rotation unit, the second angle rotation unit and the height adjustment structure to move accordingly, while enabling each of the driver motor unit to issue a feedback signal to the multiplexer.

11. The support unit system of claim 9, wherein the absorbing unit is composed of a suction cup, a vacuum tube and a base in a manner that the suction cup is disposed on the base while allowing the vacuum tube to connect to the suction cup.

12. The support unit system of claim 11, wherein the suction cup is made of an elastic material and the base is made of a rigid material.

13. The support unit system of claim 11, wherein the absorbing unit has a buffer element to be disposed at a position between the suction cup and the base, and the suction cup is made of a rigid material, the buffer element is made of an elastic material and the base is made of a rigid material.

14. The support unit system of claim 11, wherein the absorbing unit further includes an axial shaft, that is arranged penetrating through the base; the first angle rotation unit further includes a worm and a worm gear that the worm gear is coupled to the axis shaft of the absorbing unit while the worm is arranged neighboring to the worm gear at a position inside the first angle rotation unit; and the first driving element is substantially a motor and is used for driving the worm to rotate while bringing along the worm gear to rotate accordingly, and thus adjusting the rotation angle of the absorbing unit.

15. The support unit system of claim 14, wherein the first angle rotation unit includes a first reducer, and the first reducer is coupled to the worm to be used for adjusting the rotation speed of the worm.

16. The support unit system of claim 9, wherein the second angle rotation unit further includes a turn table and a second reducer; the second reducer is coupled to the turn table to be used for adjusting the rotation speed of the turn table, and further the second reducer is coupled to the second driving element, while the second driving element is substantially a motor that is used for driving the turn table to rotate so as to drive the supporting main body to rotate around the axis of the supporting main body.

17. The support unit system of claim 9, wherein the height adjustment structure further includes a lead screw and a timing pulley; the lead screw is coupled to the timing pulley, the timing pulley is coupled to the third driving element, while the third driving element is substantially a motor that is used for driving the timing pulley to rotate so as to drive the lead screw to move along the axis of the supporting main body.

18. A support unit control system, comprising:
at least one support device, each further comprising:
a supporting main body;
a first angle rotation unit, disposed at an end of the supporting main body;
a second angle rotation unit, disposed inside the supporting main body;
a height adjustment structure, disposed at another end of the supporting main body;
an absorbing unit, pivotally connected at the first angle rotation unit; and
a driver motor unit, further composed of: a first driving element, a second driving element and a third driving element in a manner that the first driving element is coupled to the first angle rotation unit for driving the first angle rotation unit to adjust a rotation angle of the absorbing unit; the second driving element is coupled to the second angle rotation unit for driving the second angle rotation unit to drive the supporting main body to rotate around an axis of the supporting main body; and the third driving element is coupled to the height adjustment structure for driving the height adjustment structure to drive the supporting main body to move along the axis of the supporting main body;
a coordinate importing unit, coupled to the at least one support device and being used for providing a position coordinate and a normal vector, wherein the normal vector is a conversion of the position coordinate;
a control unit, is couple to the coordinate importing unit for enabling the control unit to control the first driving element and the second driving element according to the normal vector and also to control the third driving element according to the position coordinate;
wherein, the first driving element is coupled to the first angle rotation unit for driving the first angle rotation unit to adjust a rotation angle of the absorbing unit; the second driving element is coupled to the second angle rotation unit for driving the second angle rotation unit to drive the supporting main body to rotate around an axis of the supporting main body; and the third driving element is coupled to the height adjustment structure for driving the height adjustment structure to drive the supporting main body to move along the axis of the supporting main body.

19. The support unit control system of claim 18, wherein the position coordinate is obtained by the decoding of a computer aided design (CAD) file.

20. The support unit control system of claim 18, wherein the absorbing unit is composed of a suction cup, a vacuum tube and a base in a manner that the suction cup is disposed on the base while allowing the vacuum tube to connect to the suction cup.

21. The support unit control system of claim 20, wherein the suction cup is made of an elastic material and the base is made of a rigid material.

22. The support unit control system of claim 20, wherein the absorbing unit has a buffer element to be disposed at a position between the suction cup and the base, and the suction cup is made of a rigid material, the buffer element is made of an elastic material and the base is made of a rigid material.

23. The support unit control system of claim 20, wherein the absorbing unit further includes an axial shaft, that is arranged penetrating through the base; the first angle rotation unit further includes a worm and a worm gear that the worm gear is coupled to the axis shaft of the absorbing unit while the worm is arranged neighboring to the worm gear at a position inside the first angle rotation unit; and the first driving element is substantially a motor and is used for driving the worm to rotate while bringing along the worm gear to rotate accordingly, and thus adjusting the rotation angle of the absorbing unit.

24. The support unit control system of claim 23, wherein the first angle rotation unit includes a first reducer, and the first reducer is coupled to the worm to be used for adjusting the rotation speed of the worm.

25. The support unit control system of claim 18, wherein the second angle rotation unit further includes a turn table and a second reducer; the second reducer is coupled to the turn table to be used for adjusting the rotation speed of the turn table, and further the second reducer is coupled to the second driving element, while the second driving element is substantially a motor that is used for driving the turn table to rotate so as to drive the supporting main body to rotate around the axis of the supporting main body.

26. The support unit control system of claim 18, wherein the height adjustment structure further includes a lead screw and a timing pulley; the lead screw is coupled to the timing pulley, the timing pulley is coupled to the third driving element, while the third driving element is substantially a motor that is used for driving the timing pulley to rotate so as to drive the lead screw to move along the axis of the supporting main body.

* * * * *